United States Patent [19]

Porsche

[11] Patent Number: 4,457,887
[45] Date of Patent: Jul. 3, 1984

[54] PROCESS FOR REACTION INJECTION MOLDING OF SILICONE CONTAINING POLYURETHANES

[75] Inventor: Arthur F. Porsche, Midland, Mich.

[73] Assignee: Dow Corning Corporation, Midland, Mich.

[21] Appl. No.: 409,489

[22] Filed: Aug. 19, 1982

[51] Int. Cl.³ .................. B29F 1/00; C08G 18/08; C08G 18/61
[52] U.S. Cl. .................. 264/300; 264/51; 264/378.6; 264/DIG. 83; 521/110; 521/170; 528/49
[58] Field of Search ............. 264/DIG. 83, 300, 328.6, 264/51; 528/49; 521/110, 170

[56] References Cited

U.S. PATENT DOCUMENTS

| | | | |
|---|---|---|---|
| 3,726,952 | 4/1973 | Boden et al. | 264/48 |
| 4,024,090 | 5/1977 | von Bonin et al. | 264/300 |
| 4,076,695 | 2/1978 | Keil | 264/DIG. 83 |
| 4,111,861 | 9/1978 | Godlewski | 264/DIG. 83 |
| 4,218,543 | 8/1980 | Weber et al. | 264/DIG. 83 |
| 4,220,727 | 9/1980 | Godlewski | 264/300 X |
| 4,254,069 | 3/1981 | Dominguez et al. | 264/DIG. 83 |
| 4,298,701 | 11/1981 | Meyborg et al. | 264/DIG. 83 |

FOREIGN PATENT DOCUMENTS 1365215 5/1972 United Kingdom .
2030582 9/1978 United Kingdom .

Primary Examiner—Philip E. Anderson
Attorney, Agent, or Firm—Robert L. McKellar

[57] ABSTRACT

A process of reaction injection molding of polyurethanes is disclosed which includes the mixing of one or more of each of polyols, isocyanates, and catalysts, the reaction of the foregoing ingredients, and the molding and curing of the foregoing mixture into the desired configuration, the improvement comprising mixing with the other ingredients a silicone selected from the group consisting of $$Z_{4-a}SiG_a \text{ and}$$
$$R_{3-d}G_dSiO(Y_{2-b}G_bSiO)_nSiG_cX_{3-c}$$

wherein Z, R, Y, and X are selected from the group consisting of hydrogen, substituted and unsubstituted hydrocarbon radicals, and mixtures thereof; G is a radical of the structure —D(OR″)$_m$OH wherein D and R″ are selected from the group consisting of substituted and unsubstituted hydrocarbon radicals, and m has a value of 1 to 50; a has a value of 1 to 4; d and c have values of 0 to 3, and b has a value of 0 to 2 wherein d, c, or b has a value of at least 1; and n has a value of 0 to 350.

The incorporation of this composition aids in the release of the molded parts, shortens the molding cycle time, and, in the reaction injection molding process of polyurethanes, allows a two-stream process.

5 Claims, No Drawings

PROCESS FOR REACTION INJECTION MOLDING OF SILICONE CONTAINING POLYURETHANES

FIELD OF THE INVENTION

This invention relates to a process of reaction injection molding of polyurethanes which include the mixing of one or more of each of polyols, isocyanates, and catalysts, the reaction of the foregoing ingredients, and the molding and curing of the foregoing mixture into the desired configuration, the improvement comprising mixing with the other ingredients a silicone selected from the group consisting of

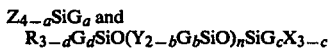

wherein Z, R, Y, and X are selected from the group consisting of hydrogen, substituted and unsubstituted hydrocarbon radicals, and mixtures thereof; G is a radical of the structure $-D(OR'')_mOH$ wherein D and R'' are selected from the group consisting of substituted and unsubstituted hydrocarbon radicals, and m has a value of 1 to 50; a has a value of 1 to 4; d and c have values of 0 to 3, and b has a value of 0 to 2, wherein d, c, or b has a value of at least 1; and n has a value of 0 to 350.

The incorporation of this composition aids in the release of the molded part, shortens the molding cycle time, and, in the reaction injection molding process of polyurethanes, allows a two stream process.

DESCRIPTION OF THE PRIOR ART

Reaction injection molding (RIM) processes can be characterized broadly as a combination of high pressure impingement mixing and rapid injection of liquid resin ingredients into molds, where the chemicals cure quickly. These processes have also been called by those in the art by such names as liquid injection molding (LIM) and liquid reaction molding (LRM), and these terms or names are considered to be synonymous for the purpose of this application.

One reason for the interest in RIM systems is the energy savings possible. For example, in the RIM processes of this invention one is working with thermosetting polyurethane resin premixes instead of thermoplastic polyurethanes which must be polymerized before molding. Also, the use of liquid ingredients eliminates the necessity of an energy consuming plasticizing screw typical of a reciprocating screw injection molding operation. In addition, lower mold clamp pressures are needed with the RIM processes as compared with thermoplastic injection molding processes. There are other advantages to the RIM processes with which those skilled in the art are familiar.

RIM processes can be used to make a wide variety of products. For example, these processes have been used to make furniture, shoe soles and heels, industrial service parts such as rollers, gears, bearing pads, and pump housing, and automotive parts such as bumpers, fascia panels, and fenders.

In the RIM processes the polyol, isocyanate, and other ingredients are pumped from larger supply tanks into a small mixing chamber where these ingredients impinge on one another at pressures usually in the range of 1500 to 3000 psi. The resulting mixture is then injected at relatively low pressures, generally in the range of 50 to 75 psi, through gates or sprues designed to provide additional mixing of the resin ingredients and to fill the mold cavity without undue agitation of the type which might cause voids in the part being made.

To prevent the molded part from adhering to the surface of the mold on removal, the mold has been treated with a mold-release agent in the past. Substances used for this purpose are, e.g., waxes, soaps, or oils. These mold-release agents form a thin film between the surface of the mold and the molded part which prevents the molded part from sticking to the mold so that the product can be easily removed from the mold.

This method has various disadvantages for the production of one molded part after the other in the same mold. First, the mold-release agent must be applied at regular intervals, during which time the mold is not available for production. Second, fine engravings on the mold, for example, a simulated wood structure or leather grain, gradually become covered with residue of mold-release agent in the course of time and the removal of these firmly adhering residues from molds is very difficult. In addition, the molded part is covered with a thin film of mold-release agent so that lacquer systems will not adhere to it. The part must therefore be rubbed down or cleaned with solvent before they are lacquered or otherwise coated in order to obtain a sufficiently firm bond between the lacquer and the molded part.

It has already been disclosed in U.S. Pat. No. 3,726,952 that the application of a mold-release agent to the mold can be dispensed with if the foamable reaction mixture is mixed with certain additives (internal mold-release agents) which impart to the finished molded product excellent release properties making it possible for it to be removed from metal molds with its surfaces intact. Salts of aliphatic carboxylic acids containing at least 25 carbon atoms with, preferably, primary amines or amines which contain amide or ester groups are known to be suitable additives of this kind.

In Great Britain Patent Number 1,365,215, a process is disclosed for the production of foam plastics by foaming a reaction mixture of polyisocyanates, compounds which contain reactive hydrogen atoms, water and/or organic blowing agents and additives in a closed mold, according to which process the additives used are, for example, (a) salts of aliphatic carboxylic acids and amines which contain amide and/or ester groups, which salts contain at least 20 aliphatic atoms, and (b) natural and/or synthetic oils, fats, or waxes.

In U.S. Pat. Nos. 4,076,695 and 4,024,090, the use of carboxy-functional siloxanes have been disclosed as mold-release agents in polyurethane systems.

All of the above-mentioned additives have an internal lubricating effect on the synthetic resin mixture. They also have the effect of imparting excellent flow properties to the mixture in the mold and reducing the formation of bubbles on the surface of the resin. In addition, these internal mold-release agents have an anti-static effect and excellent mold-release properties even in metal molds with strongly contoured surfaces. However, due to the carboxy functionality of these additives, these additives are very reactive with the other ingredients of the system and thus cannot be mixed together until just prior to the injection molding. Therefore, a three stream RIM machine is needed.

It has been discovered in accordance with the present invention that when a silicone, selected from the group consisting of

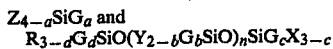

wherein Z, R, Y, and X are selected from the group consisting of hydrogen, substituted and unsubstituted hydrocarbon radicals, and mixtures thereof; G is a radical of the structure $-D(OR'')_mOH$ wherein D and R'' are selected from the group consisting of substituted and unsubstituted hydrocarbon radicals, and m has a value of 1 to 50; a has a value of 1 to 4; d and c have values of 0 to 3, and b has a value of 0 to 2 wherein d, c, or b has a value of at least 1; and n has a value of 0 to 350, is incorporated into polyurethanes for reaction injection molding, better release of the molded part and shortening of the molding cycle can be achieved. This composition also allows for a two stream RIM process since the composition of the present invention is not highly reactive with the other ingredients, namely the polyols.

It is thus an object of this invention to provide an improvement to the process of reaction injection molding of polyurethanes, the improvement comprising adding a silicone selected from the group consisting of

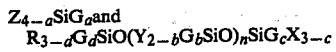

wherein Z, R, Y, and X are selected from the group consisting of hydrogen, substituted and unsubstituted hydrocarbon radicals, and mixtures thereof; G is a radical of the structure $-D(OR'')_mOH$ wherein D and R'' are selected from the group consisting of substituted and unsubstituted hydrocarbon radicals, and m has a value of 1 to 50; a has a value of 1 to 4; d and c have values of 0 to 3, and b has a value of 0 to 2 wherein d, c, or b has a value of at least 1; and n has a value of 0 to 350. This improvement allows better release of the molded part, shortens the molding cycle time, and allows the use of a two stream RIM machine in the molding of polyurethanes.

Other aspects of this invention and the objects thereof will be apparent to those skilled in the art from the following more detailed disclosure and description of the invention.

DETAILED DESCRIPTION

This invention relates to a process of reaction injection molding of polyurethanes which include the mixing of one or more of each of polyols, isocyanates, and catalysts, the reaction of the foregoing ingredients, and the molding and curing of the foregoing mixture into the desired configuration, the improvement comprising mixing with the other ingredients a silicone selected from the group consisting of

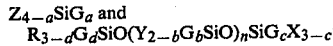

wherein Z, R, Y, and X are selected from the group consisting of hydrogen, substituted and unsubstituted hydrocarbon radicals, and mixtures thereof; G is a radical of the structure $-D(OR'')_mOH$ wherein D and R'' are selected from the group consisting of substituted and unsubstituted hydrocarbon radicals, and m has a value of 1 to 50; a has a value of 1 to 4; d and c have values of 0 to 3, and b has a value of 0 to 2 wherein d, c, or b has a value of at least 1; and n has a value of 0 to 350. The incorporation of this composition aids in the release of the molded part, shortens the molding cycle time, and, in the reaction injection molding process of polyurethanes, allows a two stream process.

As far as is known at this time, the silicone of the present invention can be any silicone selected from the group consisting of

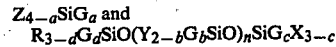

wherein Z, R, Y, and X are selected from the group consisting of hydrogen, substituted and unsubstituted hydrocarbon radicals, and mixtures thereof; G is a radical of the structure $-D(OR'')_mOH$ wherein D and R'' are selected from the group consisting of substituted and unsubstituted hydrocarbon radicals, and m has a value of 1 to 50; a has a value of 1 to 4; d and c have values of 0 to 3, and b has a value of 0 to 2 wherein d, c, or b has a value of at least 1; and n has a value of 0 to 350. It is preferred, however, that the silicone be a siloxane and that X, Y, and R be hydrocarbon radicals.

So far as is known at this time, the nature of the substituted and unsubstituted hydrocarbon radicals is not critical. Specific examples of suitable substituted and unsubstituted hydrocarbon radicals are alkyl radicals such as the methyl, ethyl, propyl, butyl, amyl, cyclohexyl, decyl, dodecyl, and octadecyl radicals; alkenyl radicals such as the vinyl and allyl radicals; aryl radicals such as the phenyl and biphenyl radicals; alkaryl and aralkyl radicals such as the tolyl and benzyl radicals; and the corresponding substituted hydrocarbon radicals such as the chloropropyl, 3,3,3-trifluoropropyl, dichlorophenyl, cyanobutyl, nitrophenyl, mercaptopropyl, carboxyethyl, and aminoisobutyl radicals.

The siloxane can be composed of mono-, di-, and tri-functional siloxane units, and mixtures thereof, with preference given to the difunctional units. It is preferred that the siloxane have the general formula $R_3SiO(Y_2SiO)_e(YGSiO)_fSiX_3$ wherein X, Y, and R are hydrocarbon radicals; e has a value of 0 to 300; f has a value of 1 to 50; and G is the radical of the structure $-D(OR'-)_mOH$ wherein D and R'' are alkylene radicals and m has a value of 1 to 10.

It is preferred, however, that X, Y, and R, be alkyl radicals, with methyl being optimal. It is not critical, however, for the purpose of this invention that X, Y, and R, be identical.

It is further preferred that e have a value of 50 to 80, f have a value of 1 to 5; D, the alkylene radical, contain from 1 to 18 carbon atoms, with propylene being preferred; R'' be selected from the group consisting of ethylene, propylene, and mixtures thereof; and m have a value of 1 to 5.

Examples of suitable silicones useful in the present invention include:

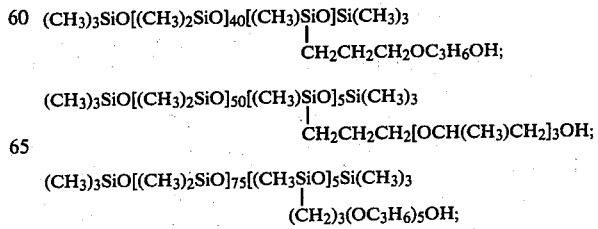

-continued

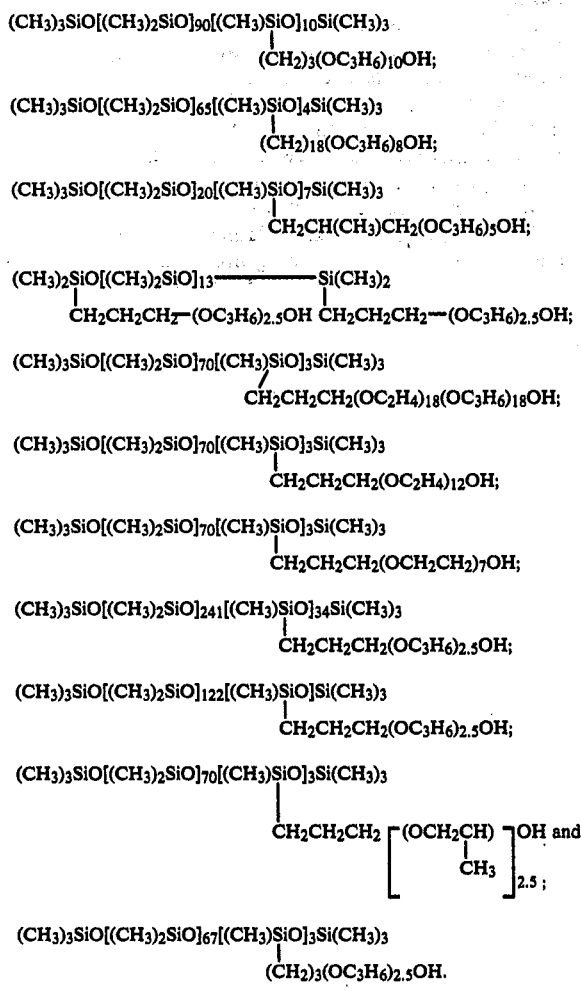

$(CH_3)_3SiO[(CH_3)_2SiO]_{67}[(CH_3)SiO]_3Si(CH_3)_3$
  |
  $(CH_2)_3(OC_3H_6)_{2.5}OH$.

The methods of preparation of the silicones of the present invention are well known to those skilled in the art. The silicone is best prepared by reacting an SiH containing siloxane and an ether capped glycol in the presence of a platinum containing hydrosilylation catalyst. It is preferred that the final composition be substantially free of all silicon bonded hydrogen radicals.

The silicone of the present invention can be either solid or liquid in form. In order to use a solid, it would be necessary to dissolve, disperse, or suspend the silicone in one of the plastic ingredients. Hence, it is preferred that the composition be in liquid form. While the viscosity of the silicone can vary over a wide range, it is generally preferred that the viscosity be in the range of from 50 to 1000 centistokes at 25° C.

The amount of silicone of the present invention incorporated into the polyurethane can vary from 0.2 to 10 percent by weight of the total polyurethane formulation. While the exact amount will necessarily be determined by individual process and manufacturing considerations, from 3 to 5 percent should satisfy most needs.

The particular polyols, isocyanates, catalysts, and additives which are employed in the thermosetting polyurethane compositions used in RIM processes are well known to those skilled in the art and detailed elsewhere in the literature. Hence no time or space need be devoted here to a repetition of such information.

Now in order that those skilled in the art may better understand how the present invention can be practiced, the following example is given by way of illustration and not by way of limitation. All parts and percents referred to herein are by weight, and all viscosities are measured at 25° C. unless otherwise specified.

Example 1

Two compositions were prepared to test the effect of an internal release agent in thermoset polyurethane compositions used in RIM processes. Composition A consisted of 100 parts by weight of a polyether polyol having a viscosity of 1200 mPa.s at 25° C. and a specific gravity of 1.02 at 25° C. and 47.5 parts by weight of an isocyanate modified with an organic. The polyether polyol and isocyanate used were similar to that used in the Mobay Bayflex ® 110-25 System. The two components were mixed using a two-stream mixing head and introduced into a closed mold that had an external mold release agent, a wax, applied to it. The temperature range of the mold was 60 to 65° C. and the material temperature was 32° C. After a demold time of 20 to 30 seconds, the molded product can be removed without adhering. At least three moldings can be produced prior to applying more external release agent.

Composition B, which represents the instant invention, was identical to Composition A except that it also contained 4 parts by weight of a silicone having the general formula

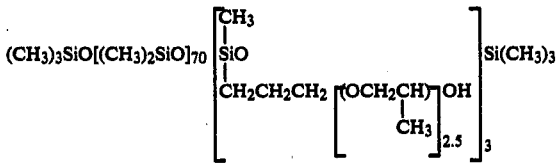

This composition was mixed with the polyether polyol and this mixture was then mixed with the isocyanate using a two-stream mixing head and then introduced into a closed mold that had an external mold release agent, a wax, applied to it. The temperature range of the mold was 60 to 65° C. and the material temperature was 32° C. After a demold time of 20 to 30 seconds, the molded product can be removed without adhering to the mold. At least 20 moldings can be produced prior to applying more external release agent.

A commercially available carboxy functional siloxane was also tried in the two-stream system. It reacted with the catalyst, causing gels, and it also deactivated the system causing weak moldings.

That which is claimed is:
1. In a process of reaction injection molding of polyurethanes which include the mixing of one or more of each of polyols, isocyanates, and catalysts, the reaction of the foregoing ingredients, and the molding and curing of the foregoing mixture into the desired configuration, the improvement comprising mixing with the other ingredient 0.2 to 10 weight percent based on the weight of the total ingredients of a silicone mold release agent selected group consisting of

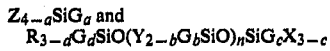

wherein Z, R, Y, and X are selected from the group consisting of hydrogen, substituted and unsubstituted hydrocarbon radicals, and mixtures thereof; G is a radical of the structure —D(OR")$_m$OH wherein D and R" are selected from the group consisting of substituted and unsubstituted hydrocarbon radicals, and m has a value of 1 to 50; a has a value of 1 to 4; d and c have values of 0 to 3, and b has a value of 0 to 2 wherein d, c, or b has a value of at least 1; and n has a value of 0 to 350.

2. A process as defined in claim 1 wherein the silicone is a siloxane having the general formula R$_3$SiO(Y$_2$SiO)$_e$(YGSiO)$_f$SiX$_3$ wherein X, Y, and R are hydrocarbon radicals; e has a value of 0 to 300; f has a value of 1 to 50; and G is the radical of the structure —D(OR")$_m$OH wherein D and R" are alkylene radicals and m has a value of 1 to 10.

3. A process as defined in claim 2 wherein X, Y, and R are alkyl radicals; e has a value of 50 to 80; f has a value of 1 to 5; D is an alkylene radical containing from 1 to 18 carbon atoms; R" is an alkylene radical selected from the group consisting of ethylene, propylene, and mixtures thereof; and m has a value of 1 to 5.

4. A process as defined in claim 3 wherein X, Y, and R are methyl radicals; and D is a propylene radical.

5. A process as defined in claims 1, 2, 3, or 4 wherein the reaction injection molding process is two-stream.

* * * * *